United States Patent
Lin et al.

(10) Patent No.: US 9,189,366 B2
(45) Date of Patent: Nov. 17, 2015

(54) SYSTEM AND METHOD FOR GENERATING A USER CALLSTACK TRACE

(75) Inventors: Yuan Lin, Cupertino, CA (US); Oleg V. Mazurov, Palo Alto, CA (US)

(73) Assignee: Oracle America Inc., Redwood City, CA (US)

( * ) Notice: Subject to any disclaimer, the term of this patent is extended or adjusted under 35 U.S.C. 154(b) by 1936 days.

(21) Appl. No.: 12/351,006

(22) Filed: Jan. 9, 2009

(65) Prior Publication Data

US 2010/0180261 A1 Jul. 15, 2010

(51) Int. Cl.
| G06F 9/44 | (2006.01) |
| G06F 11/00 | (2006.01) |
| G06F 9/45 | (2006.01) |
| G06F 11/36 | (2006.01) |
| G06F 11/34 | (2006.01) |
| G06F 11/32 | (2006.01) |

(52) U.S. Cl.
CPC ........ G06F 11/3636 (2013.01); G06F 11/3404 (2013.01); G06F 11/3476 (2013.01); G06F 8/45 (2013.01); G06F 11/323 (2013.01)

(58) Field of Classification Search
None
See application file for complete search history.

(56) References Cited

U.S. PATENT DOCUMENTS

| 6,553,564 | B1 * | 4/2003 | Alexander et al. | 717/128 |
| 7,509,632 | B2 * | 3/2009 | Boger | 717/133 |
| 7,620,945 | B1 * | 11/2009 | Song et al. | 717/149 |
| 7,673,295 | B1 * | 3/2010 | Lin | 717/156 |
| 7,735,074 | B2 * | 6/2010 | Lobo et al. | 717/158 |
| 7,882,492 | B2 * | 2/2011 | Viswanadha et al. | 717/124 |
| 2006/0218543 | A1 * | 9/2006 | Boger | 717/157 |
| 2007/0150871 | A1 * | 6/2007 | Barsness et al. | 717/128 |
| 2010/0333091 | A1 * | 12/2010 | Lin et al. | 718/100 |

OTHER PUBLICATIONS ltzkowitz, M., et al. "An OpenMP Runtime API for Profiling" Sun Developer Network [online], 2005 [retrieved Jun. 7, 2012], Retrieved from Internet: <http://developers.sun.com/solaris/articles/omp-api.html>, pp. 1-18.*

Sun Microsystems, Sun Studio 12: Performance Analyzer [online], 2007 [retrieved Jun. 7, 2012], Retrieved from Internet: <http://docs.oracle.com/cd/E19205-01/819-5264/819-5264.pdf>, pp. 1-214.*

Fuerlinger, K., et al., "Visualizing the Program Execution Control Flow of OpenMP Applications" Lecture Notes in Computer Science [online], 2008 [retrieved Jun. 7, 2012], Retrieved from Internet: <http://www.springerlink.com/content/lx82q50863777u6x/>, pp. 181-190.*

(Continued)

*Primary Examiner* — Todd Aguilera
(74) *Attorney, Agent, or Firm* — Brooks Kushman P.C.

(57) ABSTRACT

A system and method for constructing a user callstack trace in a computer to monitor a user defined Function of a user program in relation to one or more predetermined events is provided. The system and method provides generating a user callstack trace for display to the user from data in memory in relation to a predetermined event of interest to the user. The user callstack trace communicates information corresponding to the execution of the Function for the predetermined event independent of the plurality of outlined functions. The plurality of outlined functions are artificially generated in response to compiling the user program having the Function.

17 Claims, 6 Drawing Sheets

(56) References Cited

OTHER PUBLICATIONS

Lin Y., et al., "Providing Observability for OpenMP 3.0 Applications" Lecture Notes in Computer Science [online], 2009 [retrieved Jun. 7, 2012], Retrieved from Internet: <http://www.springerlink.com/content/v1x7q61x120413wq/>, pp. 104-117.*

Copty, N., "OpenMP Support in Sun Studio Compilers and Tools" Sun Developer Network [online], 2005 [retrieved Jun. 7, 2012], Retrieved from Internet: <http://developers.sun.com/solaris/articles/studio_openmp.html>, pp. 1-7.*

Cownie, J., et al. "DMPL: An OpenMP DLL Debugging Interface," Lecture Notes in Computer Science [online], vol. 2716, 2003 [retrieved Oct. 25, 2012], Retrieved from Internet: <http://www.springerlink.com/content/g658613gn56t2004/fulltext.pdf>, pp. 137-146.*

DeRose, L., et al., "An Implementation of the POMP Performance Monitoring Interface for OpenMP Based on Dynamic Probes," Proceedings of the fifth European Workshop on Open-MP-EWOMP'03 [online], 2003 [retrieved Oct. 25, 2012], Retrieved from Internet: <http://www.compunity.org/events/ewomp03/omptalks/Tuesday/Session6/T16p.pdf>, pp. 1-10.*

Nathan R. Tallent and John M. Mellor-Crummey, "Effective Performance Measurement and Analysis of Multithreaded Applications," Rice University, Feb. 14-18, 2009, Raleigh, North Carolina, pp. 229-239.

* cited by examiner

SYSTEM AND METHOD FOR GENERATING A USER CALLSTACK TRACE

BACKGROUND

1. Technical Field

One or more embodiments of the present invention generally relate to a system and method for generating a user callstack trace.

2. Background Art

High level parallel programming languages, such as, but not limited to OpenMP, provide high level constructs which gives users the ability to specify concurrent entities. Implementations of such programming languages outline the body of a construct into a separated function that may be called back by a corresponding parallel runtime library for concurrent execution.

A native callstack corresponds to a reserved stack of memory that includes data. The data corresponds to code that is actually being executed by various execution entities or has been executed by the various execution entities. Such data may be presented to the programmer as a trace. While inspecting the native callstack when the user's program is executed concurrently on the various execution entities, the contents of the native callstack may be different from the actual user code due to runtime libraries and threads that call various functions within a particular programming language. Such a condition may alter a programmer's ability to locate callee/caller relationships or other such logical relationships in the native callstack while observing various points of interests or "events" within the system.

In general, the logic within the native callstack is different from that within the user's program making debugging or profiling of other such performance events difficult for programmers. Conventional tools are not capable of providing a callstack that provides traceable data that coincides with the logic in the user's program.

SUMMARY

A method for constructing a user callstack trace in a computer to monitor a user defined Function of a user program in relation to one or more predetermined events is provided. The method comprising compiling a user program having the Function to generate executable code, the executable code including the Function and a plurality of outlined functions, wherein the plurality of outlined functions are artificial functions generated responsive to the compiling and are generally associated with the Function. The method further comprises generating a spawn task for each outlined function. The method further comprises executing the Function and the spawn tasks on a first execution entity. The method further comprises spawning one or more of the plurality of outlined functions from the execution entities such that the one or more of plurality of outlined functions are executed on at least one second execution entity responsive to the first execution entity executing the spawn tasks. The method further comprises obtaining a task record for each of the one or more plurality outlined functions that are spawned and storing data corresponding to the task record in memory. The method further comprises generating a user callstack trace for display to the user from the data in the memory in relation to a predetermined event of interest to the user, the user callstack trace communicating information corresponding to the execution of the Function for the predetermined event independent of the plurality of outlined functions.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION

Detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

One or more embodiments of the present invention generally provides a mechanism for constructing a user callstack from a native callstack so that data included within the user callstack can be used by a programmer to trace through the manner in which various execution entities executed compiled user code to assess various aspects related to predetermined events or points of interest. The user callstack may provide the data in a manner that is intelligible to the programmer while code is being executed either sequentially or in parallel. The programmer may have the ability to trace callee/caller relationships between different functions while observing various events in the system.

Figure 1:
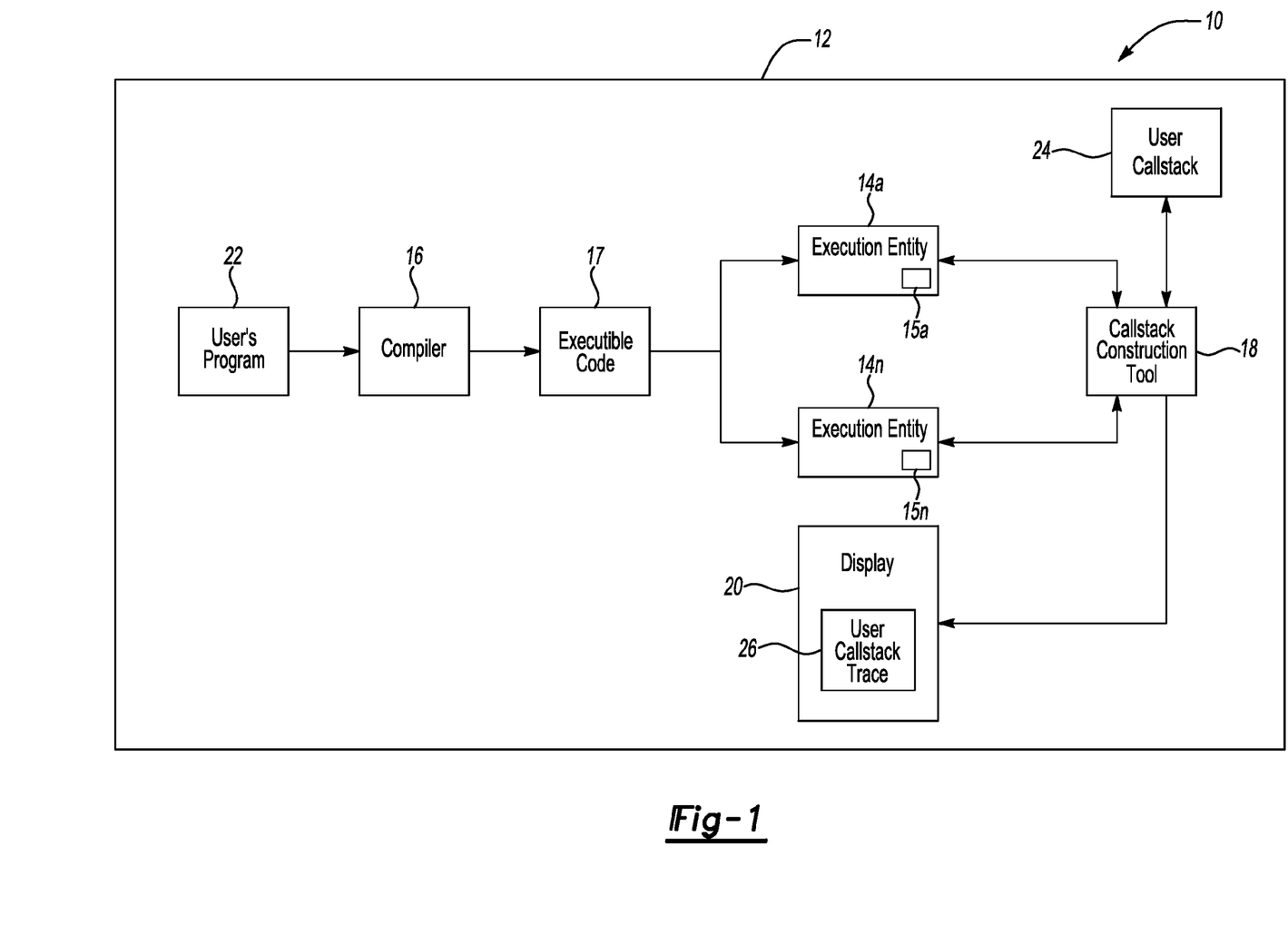
FIG. 1 is a system for reconstructing a user callstack in accordance to one embodiment of the present invention.

FIG. 1 is a system 10 for constructing a user callstack in accordance to one embodiment of the present invention. The system 10 includes a computer 12, plurality of execution entities 14a-14n, a compiler 16, a callstack construction tool 18, a display 20, and a user call stack 24. Each execution entity 14a-14n may be implemented as, but not limited to, a central processing unit (CPU). Each execution entity 14a-14n includes memory 15a-15n that stores a trace of the program that is being executed within a corresponding execution entity 14a-14n. Portions of the memory 15a-15n may comprise the native callstack. Data within the native callstack can be retrieved and presented as a trace to the programmer. The computer 12 includes hardware for executing operations as disclosed herein. Each of the components 14a-14n, 16, 18, 20, and 22 within the computer 12 may be hardware, software, or combination thereof. The callstack construction tool 18 is generally configured to store data in the user callstack 24 from data within the native callstack. The display 20 may present a user callstack trace 26 from data (i.e., data that is constructed (or obtained) from the callstack construction tool 18) within the user callstack 24 so that the user is capable of monitoring the manner in which the code is being executed on the execution entities 14a-14n. The user callstack 24 is a reserved region of memory that stores data corresponding to the manner in which code is being executed in the execution entities 14a-14n.

The compiler 16 may compile a user's program 22 to generate compiled executable code 17 so that the one or more of the execution entities 14a-14n may execute the executable code 17 either sequentially or in parallel with one another. In conventional systems, during the execution of the compiled code with the various execution entities 14a-14n, the display 20 may present the data from the native callstack. Such contents may provide details with respect to the manner in which the user's program was executed. The contents of the native callstack may not correspond to the logic in the user's program 22 due to the generation of various outlined functions and other such factors when the user's program 22 is compiled. The outlined functions may be generated by the compiler 16 and are executed by threads that call various functions within a particular programming language. Such a condition may make it difficult for a programmer to trace back through the callstack to look for predetermined events or to identify callee/caller relationships between functions of the code. This condition may make it difficult for a programmer to troubleshoot or debug aspects of the user's program.

The callstack construction tool 18 is operatively coupled to the execution entities 14a-14n for generating data that corresponds to the logic of the user's program 22 and for storing such data on the user callstack 24. The callstack construction tool 18 transmits the data from the user callstack 24 to the display 20 as a user callstack trace 26 so that a programmer may view the data within the user callstack to observe events or points of interest in the user's code. By observing such data (or the user callstack trace 26) via the display 20, the programmer may profile performance issues or debug various aspects of the user's program 22. It is generally contemplated that the system 10 may be used with high level programming languages such as, but not limited to, OpenMP, High Performance Fortran (HPF), Cilk, Co-Array Fortran or other suitable languages, and/or compilation systems, such as, but not limited to, automatic parallelizing compilers.

Figure 2:
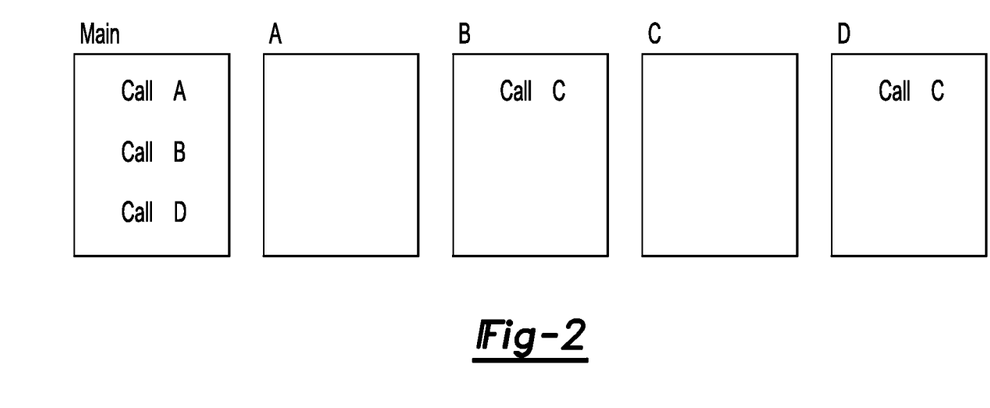
FIG. 2 illustrates executable code of a user's program.

FIG. 2 illustrates an example of executable code that may be associated with the user's program 22. The user's program generally includes a MAIN program listing containing calls A, B, and D. A call is generally defined as an interruption containing an instruction to jump to another routine or function. For example, call A (in MAIN) corresponds to a jump from MAIN to Function A. Call B (in MAIN) corresponds to a jump from MAIN to Function B. Call D (in MAIN) corresponds to a jump from MAIN to Function D. Call C (in Function B) corresponds to a jump from Function B to Function C. Call C (in Function D) corresponds to a jump from Function D to Function C.

Figure 3:
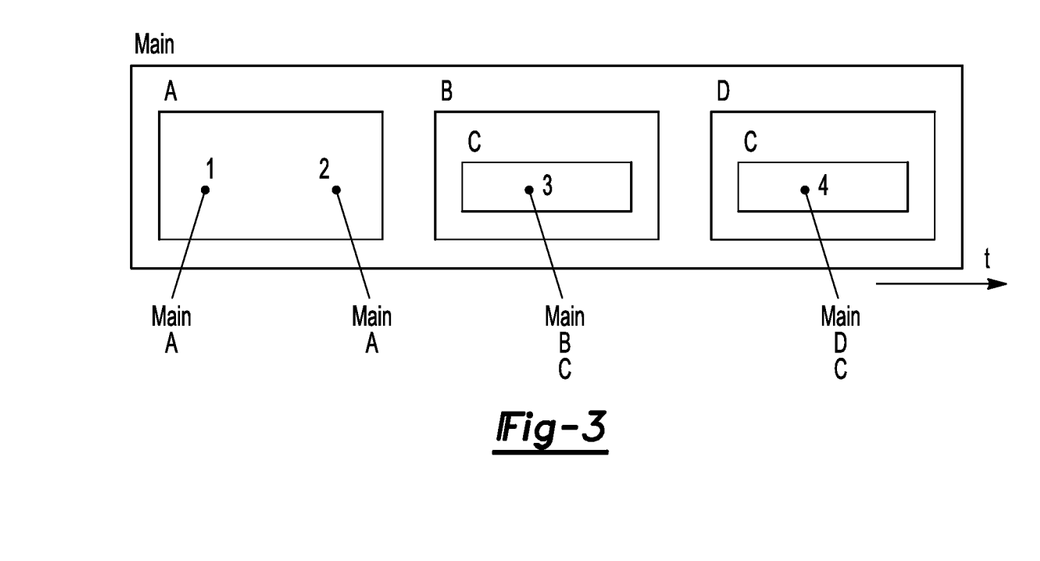
FIG. 3 illustrates a user's model of program execution.

FIG. 3 illustrates a high level representation of the execution of the user's program 22. Such a model generally represents the runtime caller/callee relationship as defined by the user's program 22. This model does not illustrate what is actually being shown in the native callstack as a result of compiling and executing the user's program. As shown, MAIN is called and jumps to Function A. Function A includes first and second events 1, 2 respectively, which correspond to any point of interest or event that the programmer may have with respect to the manner of the executed code. The event may be, but not limited to, a clock-based profiling event, a hardware counter overflow event, and/or a user defined debugging break point. It is contemplated that the event may correspond to any foreseeable item that may be of interest or require monitoring by a programmer. MAIN then calls Function B. Function B then calls Function C. Function C may include a third event 3. MAIN then calls Function D. Function D then calls Function C. Function C may include a fourth event 4. The third and fourth events 3, 4 may relate to or correspond to a point of interest that may need to be observed by the programmer during the execution of the user's program 22.

In general, the callstack construction tool 18 is configured to present data from the user callstack 24 that coincides with the logic of the user's program 22 as the user callstack trace 26 so that a programmer is given the entire context (or logic) for the events when the user's program 22 executed. For example, the callstack construction tool 18 provides a user callstack trace 26 that may depict that the first and the second events 1, 2 are in Function A and that Function A is within MAIN. Likewise, the third event 3 is in Function C, Function C is in Function B, and Function B is in MAIN. Further, the fourth event 4 is in Function C, Function C is in Function D and Function D is within MAIN. As will be discussed in connection with FIGS. 4-5, when the user's program is actually complied and executed, it may not be possible to obtain the entire context (or caller (transmitter)/callee (receiver) relationships) between the functions for events of interest in the system. Stated otherwise, the logic within the native callstack may not correspond to the logic as depicted in the user's program 22. As such, the callstack construction tool 18 generates and stores data in the user callstack 24 from data within the native callstack and generates the user callstack trace 26 so that the programmer may trace or follow logic as one or more of the execution entities 14a-14n execute a compiled version of the user's program 22.

Figure 4:
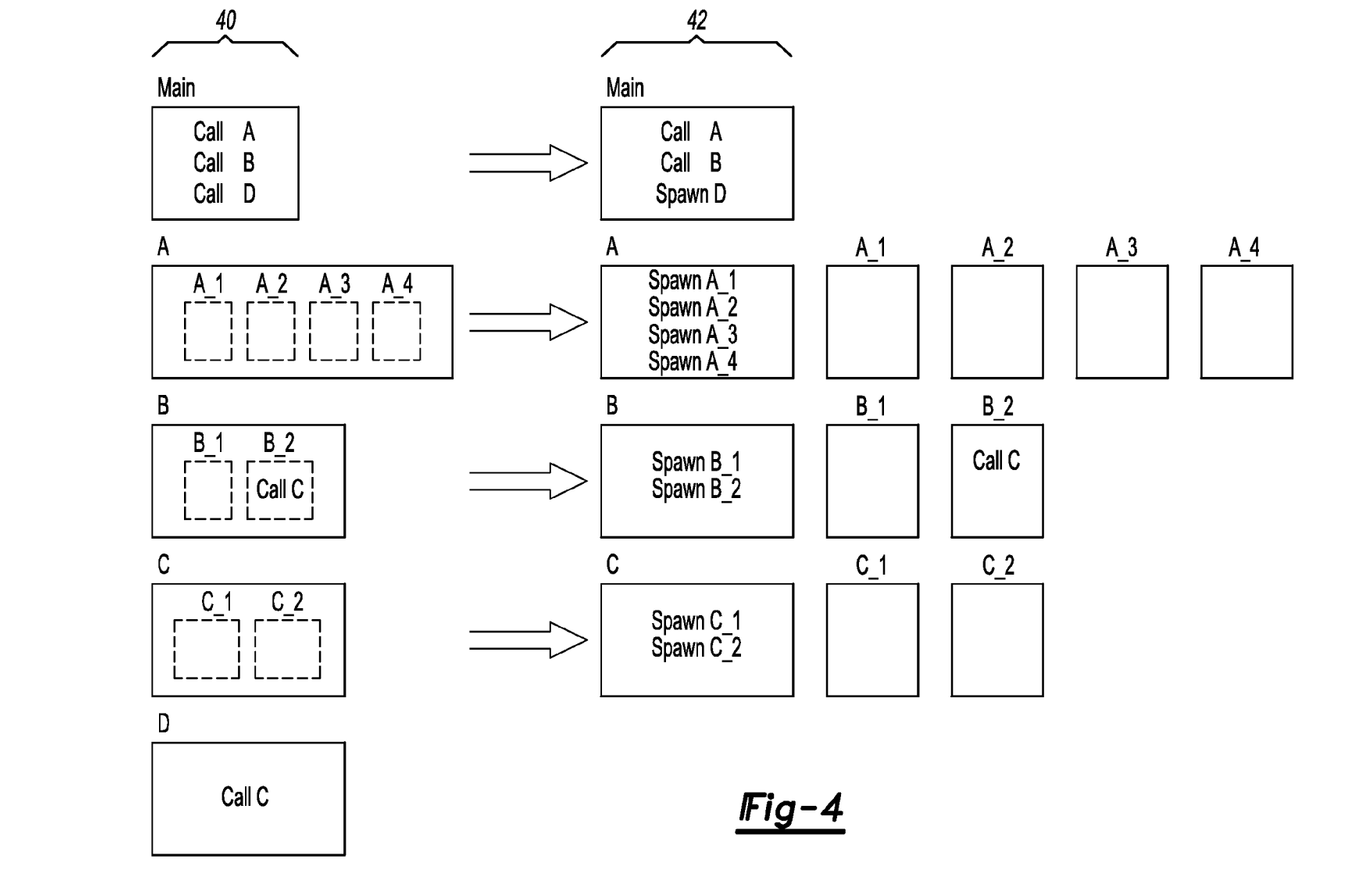
FIG. 4 illustrates a compiler transformation of the user's program.

FIG. 4 illustrates an example depicting the transformation of the user's program 22 by the compiler 16. Column 40 represents pieces of code segments that are generated in response to compiling MAIN and Functions A, B, C, and D in the user's program 22. At Function A, four pieces of code segments A_1, A_2, A_3, and A_4 are defined as outlined functions. Such outlined functions are new pieces of code generated by the compiler 16 and are artificial functions that did not exist in the original user's program 22. At Function B, two pieces of code segments B_1 and B_2 are defined as outlined functions. Again, such outlined functions contained in Function B are new pieces of code generated by the compiler 16 and are artificial functions that did not exist in the original user's program 22. At Function C, two pieces of code segments C_1 and C_2 are defined as outlined functions. The outlined functions contained in Function C are new pieces of code generated by the compiler 16 and are artificial functions that did not exist in the original user's program 22. Function D includes a call to Function C and does not include any outlined functions or artificial functions. In MAIN, the call of Function D is determined to be asynchronous (e.g., no outlined function or artificial function). The compiler 16 is generally configured to determine which code segments are outlined functions or are asynchronous based on, but not limited to, language constructs used and/or data flow/control flow analysis performed by the compiler 16. For example, in an OpenMP program, the body of a parallel construct may be a candidate for outlining. In another example, an automatic parallelizing compiler may outline a parallel loop it detects.

Column 42 illustrates that MAIN, Functions A-D and the outlined functions A_1, A_2, A_3, A_4, B_1, B_2, C_1, and C_2 are to be executed by any one or more of the execution entities 14a-14n as separate functions. The compiler 16 may generate a spawn task for each outlined function of a corresponding function. For example, spawn task D is generated so that when MAIN is executed, Function D can then be executed (though not necessarily) by execution entities that are different from the execution entity that executes MAIN. In addition, spawn tasks A_1, A_2, A_3, and A_4 may be generated so that the outlined functions A_1, A_2, A_3, and A_4 can be executed by any execution entity other than the execution entity that executes Function A. In addition, spawn tasks B_1 and B_2 may be generated so that the outlined functions B_1 and B_2 can then be executed by any execution entity other than the execution entity that executes Function B. Further, spawn tasks C_1 and C_2 may be generated so that the outlined functions C_1 and C_2 can be executed by any execution entity other than the entity that executes Function C.

Figure 5:
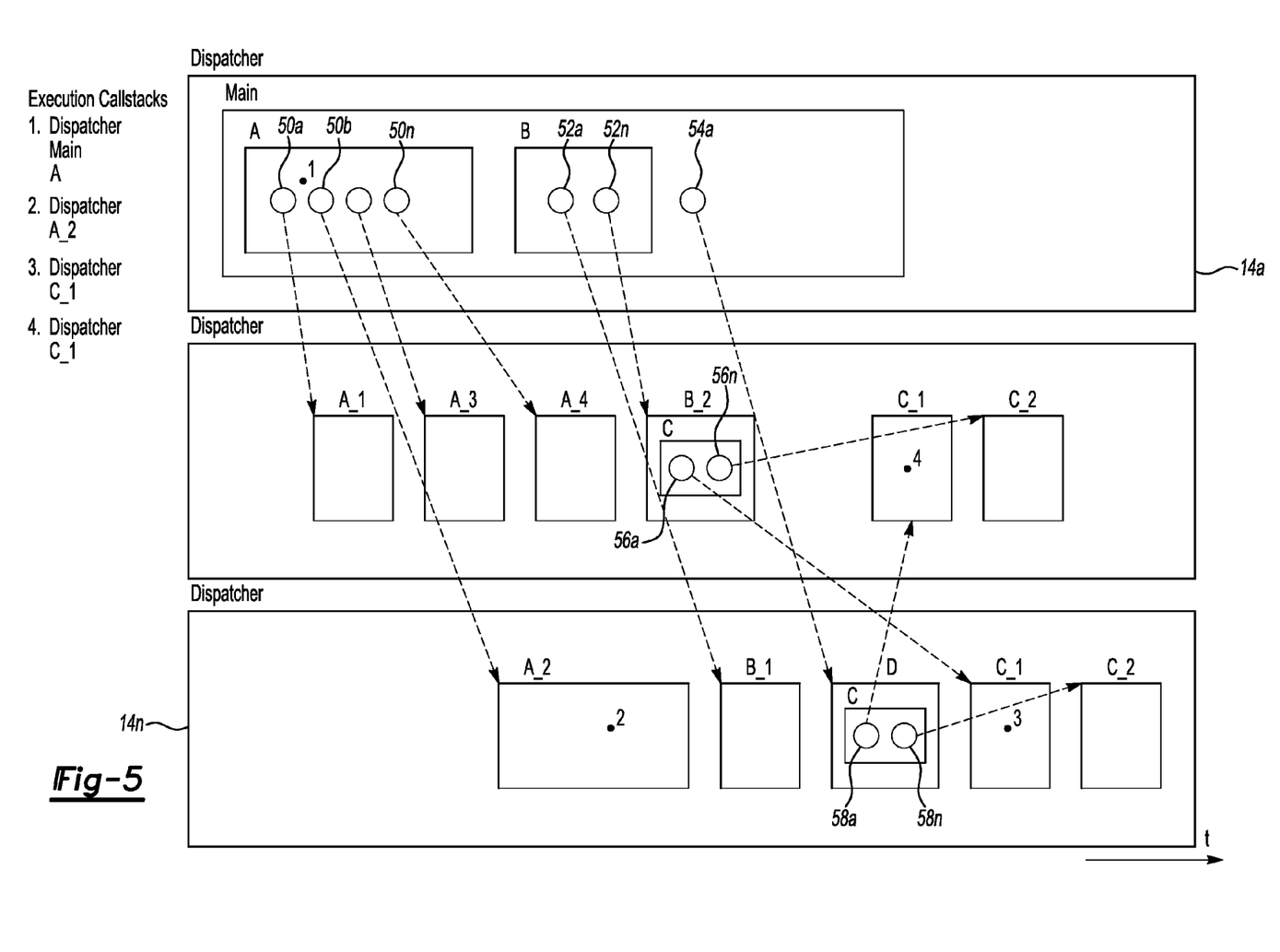
FIG. 5 illustrates the user's program being executed.

FIG. 5 illustrates one example as to the manner in which the execution entities 14a-14n may execute the compiled user's program as described in reference to FIG. 4. The execution entities 14a-14n may be separate CPUs or separate threads and may be configured to execute the compiled user's program in parallel with respect to one another over time. It is generally contemplated that the execution entities 14a-14n may also be configured to execute the compiled user's program sequentially. The execution entity 14a executes MAIN and Functions A and B. Spawn events 50a-50n within Function A of execution entity 14a correspond to the spawn tasks A_1, A_2, A_3, and A_4, respectively. Spawn events 52a-52n within Function B of execution entity 14b correspond to the spawn tasks B_1 and B_2, respectively. Spawn event 54a within MAIN of execution entity 14a corresponds to the spawn task D. Spawn events 56a-56n within Function C of execution entities 14b and 14n correspond to spawn tasks C_1 and C_2, respectively.

In operation, the following events may occur with reference to FIG. 5:

(i) execution entity 14a executes MAIN, which calls Function A, spawn event 50a spawns outlined function A_1 which will be executed in execution entity 14b; spawn event 50b spawns outlined function A_2 which will be executed in execution entity 14n; spawn event 50c spawns outlined function A_3 which will be executed in execution entity 14b; spawn event 50n spawns outlined function A_4 which will be executed in execution entity 14b;

(ii) execution entity 14a executes MAIN, which calls Function B, spawn event 52a spawns outlined function B_1 which will be executed in execution entity 14n, spawn event 52n spawns outlined function B_2 which will be executed in execution entity 14b. Further, as execution entity 14a executes MAIN, spawn event 54a spawns Function D;

(iii) execution entity 14b executes outlined function B_2, outlined function B_2 calls Function C, spawn event 56a spawns outlined function C_1 which will be executed in execution entity 14n; spawn event 56n spawns outlined function C_2 for execution in execution entity 14b; and (iv) execution entity 14n executes Function D, Function D calls Function C, spawn event 58a spawns outlined function C_1 which will be executed in execution entity 14b; spawn event 58n spawns outlined function C_2 which will be executed in execution entity 14n.

The compiler 16 generates code for the outlined functions C_1 and C_2 and there is only one instance of code for each. During execution, each instance of code is executed twice (e.g., when called by Function C and D). In light of the above condition, two instances of outlined functions for C_1 and C_2 are shown in FIG. 5. It is generally contemplated that a spawn instruction can be executed in any execution unit. The implementation as shown in FIG. 5 is provided for illustrative purposes.

As noted above in connection with FIG. 3, a programmer may be interested in observing events 1-4 while the program is being executed. For example, the programmer may intend to view data within the callstack 24 to investigate various aspects of the events 1-4 in order to determine the origin of the Function in which the particular event occurred. However, the actual native callstack is not capable of providing information with respect to the manner in which the various functions A-D are called on by one another with respect to the various events 1-4. While FIG. 5 includes arrows, which depict the manner in which the functions and the outlined functions are called by one another with various spawn points, such arrows are shown for illustrative purposes. With conventional systems, from a practical perspective, there may not be a mechanism in place between the execution entities 14a-14n that can monitor or trace the logic as to which function calls other such functions or outlined functions, or monitor or trace the origin and or destinations of the various spawn instructions.

For example, with respect to event 2 (see execution entity 14n in FIG. 5), the programmer is not capable of determining that event 2 occurred (or happened) in Function A and that Function A was called by MAIN based on the type of information contained within the native callstack. The programmer can only see data from within the native callstack that event 2 occurred in the outlined function A_2 and that the outlined function was called by a dispatcher of the execution entity 14n. The dispatcher is generally defined as a set of routines that are responsible for allocating execution entity time for executing various instructions. Likewise, the programmer is not capable of determining that event 3 occurred in Function C, that Function C was called by Function B and that Function B was called by MAIN based on the type of information provided by the native callstack. The programmer can only see data from within the native callstack that event 3 occurred in the outlined function C_1 and that the outlined function C_1 was called by a dispatcher of the execution entity 14n.

Figure 6:
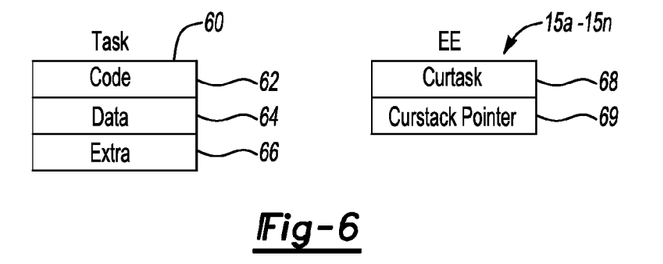
FIG. 6 illustrates contents of a task and execution entity.

FIG. 6 illustrates contents of a task record data structure 60. The task record data structure 60 is not an entity but a trace or record that includes various types of information for display for the programmer. The task record data structure 60 depicts information with respect to actual data (e.g., code 62, data 64, and extra 66) stored within the memories 15a-15n and/or the user callstack 24. Each spawn event 50a-50n, 52a-52n, 54a, 56a-56n and 58a-58n (see FIG. 4 (e.g., spawn task A-1-A-4, B-1-B2 and C_1-C_2)) is generally configured to perform a task. Each spawn task includes an associated piece of data that describes what the task is. Code 62 corresponds to a particular outlined function (e.g., A_1-A_4, B_1-B_2, or C_1-C_2). Data 64 corresponds to any data the outlined function is needed to work on. The callstack construction tool 18 is generally configured to obtain information with respect to the spawn events 50a-50n, 52a-52n, 54a, 45a-56n and 58a-58n as such events occur within the various execution entities 14a-14n. The stored data which comprise the task record data structure 60 include a task record with respect to the spawn events 50a-50n, 52a-52n, 54a, 56a-56n and 58a-58n as they occur so that the callstack construction tool 18 is capable of generating the user callstack trace 26.

Each memory 15a-15n of the execution entities 14a-14n includes a curtask 68 and a curstack pointer 69. The relevance of curstack pointer 69 will be discussed in more detail below. Curtask 68 stores the task record in extra 66 (which is also capable of being displayed via the task record data structure 60) which corresponds to a current task (or Function) that a particular execution entity 14a-14n is executing. The callstack construction tool 18 may access curtask 68 and move the data within the curtask 68 into extra 66.

Figure 7:
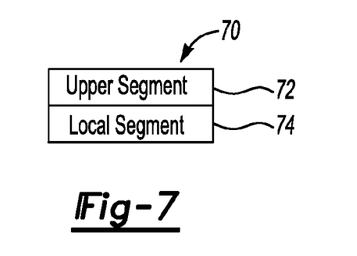
FIG. 7 illustrates a user callstack segment that contains an upper segment and a local segment.

FIG. 7 illustrates a user callstack segment 70 that contains an upper segment 72 and a local segment 74. The upper segment 72 generally stores information with respect to the spawn event the moment in which a particular instruction for a current task is executed by a corresponding execution entity 14a-14n. The local segment 74 stores information with respect to the Function or outlined function when an event occurs. It is generally understood that regardless of the type of event (e.g., profiling event or spawn event), the callstack segment 70 includes the upper segment 72 and the local segment 74. The user callstack trace 26 may present the contents of the user callstack segment 70 via the display 20 to the programmer. For example, the user callstack trace 26 may present the information within the upper segment 72 and the local segment 74 for display to the programmer. Such data will not include the outlined function (or artificial functions).

Figure 8:
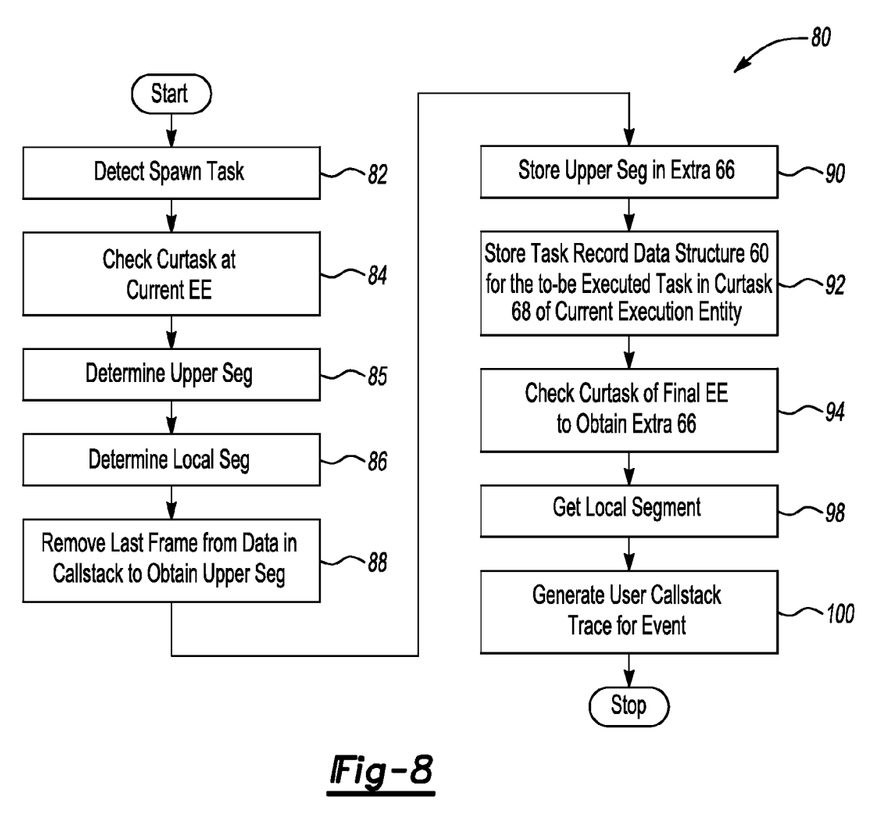
FIG. 8 illustrates a method for generating a user call stack trace for an event.

FIG. 8 illustrates a method 80 for generating a user callstack trace 26 for an event in accordance to one embodiment of the present invention. The method 80 will be set forth with respect to a spawn task A_2 (or spawn event 50b) and a programmer's interest in event 2 (see FIG. 5 for reference).

In operation 82, the callstack construction tool 18 detects an occurrence of a spawn event or spawn instruction. As noted in connection with FIG. 4, the compiler 16 may generate a spawn task for each outlined function. As such, when the spawn task A_2 is spawned (see spawn event 50b), the callstack construction tool 18 begins the process of creating the task record(s) for the spawn task A_2 (or spawn event 50b).

In operation 84, the callstack construction tool 18 checks curtask 68 at the current execution entity. In relation to spawn task A_2, the callstack construction tool 18 checks curtask 68 at execution entity 14a because execution entity 14a is the current execution entity for the spawn event 50b.

In operation 85, the callstack construction tool 18 determines the upper segment 72 at the current execution entity (e.g., execution entity 14a in this case) for the spawn event 50b. The callstack construction tool 18 finds that there is no task record (e.g., because execution entity 14a is not executing a task at this moment). So the upper segment 72 is deemed to be empty at this point. It is necessary to have to find the upper segment 72 for the spawn event 50b.

In operation 86, the callstack construction tool 18 determines the local segment 74 at the current execution entity (e.g., execution entity 14a in this case). The callstack construction tool 18 determines that the local segment is MAIN and Function A.

In operation 88, the callstack construction tool 18 removes the last frame to obtain the upper segment 72 for the spawn task A_2. For example, the tool 18 removes Function A (e.g., the last frame) and designates MAIN as the upper segment 72.

In operation 90, the callstack construction tool 18 stores the upper segment 72 in extra 66 and the task record data structure 60 depicts the data stored in extra 66 of the spawn task A_2. For example, the tool 18 stores MAIN in extra 66 (and the other relevant information in code 62 and data 64), and the task record data structure 60 depicts MAIN for the spawn task A_2.

In general, operations 82-90 occur the moment in which a task is spawned.

In operation 92, the execution entity 14n is configured to execute spawn task A_2. The execution entity 14n accesses the contents of the task record data structure 60 for the task that is to be executed (e.g., spawn task A_2) and stores the contents of the task record data structure 60 (i.e., the task record) in its curtask 68. As such, the execution entity 14n stores MAIN from the task record data structure 60 in curtask 68.

In operation 94, in response to event 2 occurring, the callstack construction tool 18 checks curtask 68 of execution entity 14n and finds that there is a task record. As noted in connection with operation 92, curtask 68 of execution entity 14n includes MAIN. As such, the callstack construction tool 18 obtains MAIN and stores in the upper segment 72.

In operation 98, the callstack construction tool 18 obtains the local segment 72 which is outlined function A_1 and is mapped to Function A in this case.

In operation 100, the callstack construction tool 18 generates the user callstack trace 26 for event 2. The user callstack trace 26 generated by the callstack construction tool 18 is upper segment 72=MAIN and local segment 74=Function A.

Operations 94-100 generally occur when event 2 is an item of interest for the user. Since event 2 is not a spawn event (or spawn task), the callstack construction tool 18 may not create a task record (or generate a task record data structure 60) or an upper segment 72 for event 2.

In general, the method 80 performs one or more of the above operations for all applicable spawn tasks (A_1-A_4, B_1-B_2, and C_1-C_2). While operations 82-100 are directed toward spawn task A_2, it is contemplated that one or more of the above operations may be applied to the all of the spawn tasks so that a record is made of the callee/caller relationships for all of the spawn tasks while the compiler 16 transforms the user's program 22. The Functions stored in the upper segment 72 and/or the local segment 74 may be used as task records and may be stored in extra 66 moved into curtask 68 of one or more of the execution entities 15a-15n. Accordingly, during an event of interest for the user, the callstack construction tool 18 is configured to obtain the task record from one or more curtasks 68 belonging to one or more of the execution entities to generate the user callstack trace 26.

Figure 9:
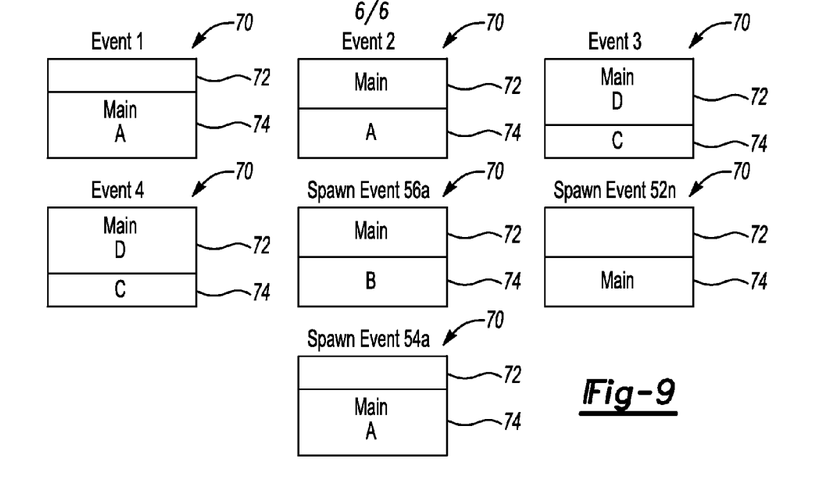
FIG. 9 illustrates various user callstack segments which correspond to events noted in connection with FIG. 5.

FIG. 9 illustrates various user callstack segments 70 that may be generated via the method 80 which correspond to the events 1-4 and spawn events 52n, 54a, and 56a of FIG. 5.

Figure 10:
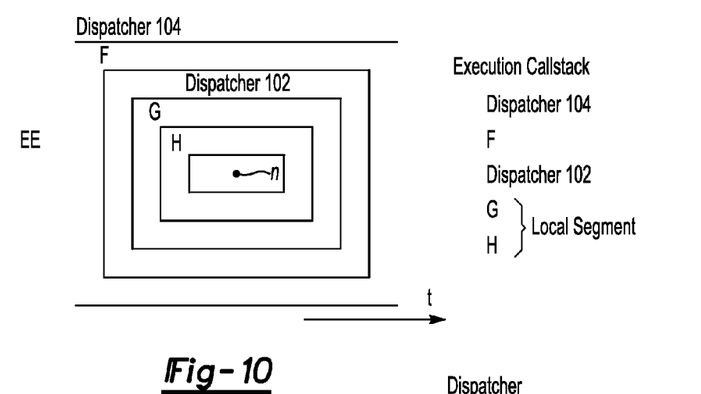
FIG. 10 illustrates the manner in which a local segment is determined.

FIG. 10 depicts the manner in which the local segment 74 may be obtained. In general, the callstack construction tool 18 may derive the local segment 74 from the one or more memories 15a-15n (native callstack) at the one or more execution entities 14a-14n. For example, during the execution of a task, one or more of the execution entities 14a-14n may switch to execute a dispatcher 102. Another dispatcher, (e.g. 104) may switch to execute another task while holding the stack frame of old tasks. As shown in FIG. 10, Functions F, G, and H are being executed. Function F may belong to an old task and Functions G and H may belong to a current task that is currently being executed. When an event n occurs, it is necessary to obtain the local segment 74 of the current task. Further, the local segment 74 may not include Function F and the dispatcher 104 since they do not belong to the local task that is being executed (e.g., function G and H). The local segment 74 may include Function G and H. The problem is that it is necessary to make a determination as to which function (e.g., current tasks) are to be included in the local segment 74 and which functions (e.g., old tasks) are to be excluded from the local segment 74. The callstack construction tool 18 makes such a determination by requesting one or more of the execution entities 14a-14n to transmit a stack pointer from the dispatcher 102. One or more of the execution entities 14a-14n are generally configured to store current stack pointer in curstack pointer 69 as illustrated in connection with FIG. 6. As the callstack construction tool 18 queries one or more of the execution entities 14a-14n for the curtask 68, the tool 18 also queries for the stack pointer (e.g., curstack pointer 69). The tool 18 may traverse data within the native callstack from bottom to top and stop at the frame that contains the stack pointer. In response, to detecting the stack pointer, the tool 18 may obtain the current task which can than be used by the tool 18 to determine the local segment 74.

Figure 11:
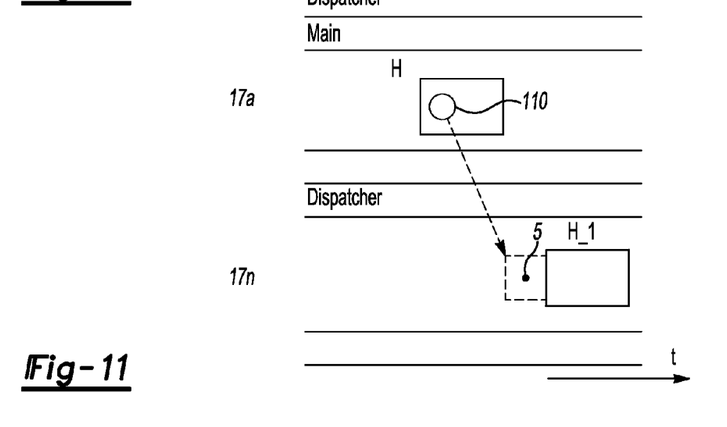
FIG. 11 illustrates events that occur outside of the user's program.

FIG. 11 depicts another implementation in which the local segment 74 may be obtained. Additional execution entities 19a-19n may be included within the system 10 along with another event 5 that is of interest for the programmer. Function H and outlined function H_1 are to be executed in execution entity 19a and execution entity 19n, respectively. Spawn event 110 corresponds to spawn task H_1. FIG. 11 illustrates the condition in which a time delay is present between when the execution entity 19n is scheduled to execute outlined function H_1 and when the execution entity 19n actually executes outlined function H_1. Assuming event 5 (a point of interest for the programmer) occurs (or happens) within a time window. The issue presented with such a condition is attempting to determine the contents of the native callstack. The tool 18 may obtain the upper segment 72 as noted above in connection with FIG. 8. In order for the tool 18 to find the local segment 74, the tool 18 adds a spawn location to extra 66 and uses such information as the local segment 74. The spawn location can be, but not limited to, the PC of the spawn instruction.

As such, when event 5 occurs and if the tool 18 determines that the local segment 74 is empty, then the user callstack segment 70 (see FIG. 7) includes upper segment 72 and the spawn location. If the tool 18 determines when event 5 occurs and that the local segment 74 is not empty, then the user callstack segment 70 includes the upper segment 72 and the local segment 74 as described above in connection with FIG. 8.

It is recognized that the embodiments disclosed herein may include a computer program product that includes a non-transitory computer readable medium operable to store computer logic embodied in computer program code encoded thereon for constructing a user callstack trace in a computer to monitor a user defined Function of a program listing of a program in relation to one or more predetermined events. The computer program product having computer code for performing operations herein.

It is generally contemplated that one or more embodiments of the present invention are capable of being performed via hardware, software (code) or any combination thereof. While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for constructing a user callstack trace in a computer to monitor a user defined Function of a user program in relation to one or more predetermined events, the method comprising:

compiling a user program having the Function to generate executable code, the executable code including the Function and a plurality of outlined functions, wherein the plurality of outlined functions are artificial functions generated responsive to the compiling and are generally associated with the Function;

generating a spawn task for each outlined function;

executing the Function and the spawn tasks on a first execution entity;

spawning one or more of the plurality of outlined functions from the first execution entity such that the one or more of the plurality of outlined functions are executed on at least one second execution entity responsive to the first execution entity executing the spawn tasks;

obtaining a task record for each of the one or more of the plurality of outlined functions that are spawned, wherein a task record data structure includes a code section that stores a particular outlined function, a data section that stores first data the particular outlined function is needed to work on, and an extra section that stores the task record;

storing second data corresponding to the task record data structure in memory;

generating a user callstack trace for display to the user from the second data in the memory in relation to a predetermined event of interest to the user, the user callstack trace for communicating information corresponding to the execution of the Function for the predetermined event without the plurality of outlined functions; and adding a spawn location to the extra section to determine a local segment if the predetermined event occurs after one of the plurality of outlined functions is scheduled to execute but before the one of the plurality of outlined functions is actually executed.

2. The method of claim 1 wherein the user callstack trace includes an upper segment and the local segment.

3. The method of claim 2 further comprising requesting a stack pointer from the second execution entity to determine the local segment.

4. The method of claim 2 wherein the upper segment is defined as a current spawn task that is being executed with a last frame being removed.

5. The method of claim 2 wherein obtaining a task record for each of the one or more of the plurality of outlined functions that are spawned further comprises storing the Function in the extra section.

6. The method of claim 5 wherein each execution entity includes a curtask that stores third data related to the Function for storage in the extra section.

7. The method of claim 1 wherein the predetermined event corresponds to one or more of a clock-based profiling event, a hardware counter overflow event, and a user defined debugging break point.

8. The method of claim 1 wherein generating the user callstack trace further comprises generating the user callstack trace for at least one of OpenMP, High Performance Fortran (HPF), Cilk, and Co-Array Fortran applications.

9. A system for constructing a user callstack trace to monitor a user defined Function of a user program in relation to one or more predetermined events, the system comprising:

a first computer configured to:

compile a user program having the Function to generate executable code, the executable code including the Function and a plurality of outlined functions, wherein the plurality of outlined functions are artificial functions generated responsive to the compiling and are generally associated with Function;

generate a spawn task for each outlined function;

execute the Function and the spawn tasks on a first execution entity;

spawn one or more of the plurality of outlined functions from the first execution entity such that the one or more of the plurality of outlined functions are executed on at least one second execution entity responsive to the first execution entity executing the spawn tasks;

obtain a task record for each of the one or more of the plurality of outlined functions that are spawned, wherein a task record data structure includes a code section that stores a particular outlined function, a data section that stores first data the particular outlined function is needed to work on, and an extra section that stores the task record;

store second data corresponding to the task record data structure in memory;

generate a user callstack trace for display to a user from the second data in the memory in relation to a predetermined event of interest to the user, the user callstack trace for communicating information corresponding to the execution of the Function for the predetermined event without the plurality of outlined functions; and add a spawn location to the extra section to determine a local segment if the predetermined event occurs after one of the plurality of outlined functions is scheduled to execute but before the one of the plurality of outlined functions is actually executed.

10. The system of claim 9 wherein the user callstack trace includes an upper segment and the local segment.

11. The system of claim 10 wherein the first computer is further configured to request a stack pointer from the second execution entity to determine the local segment.

12. The system of claim 10 wherein the upper segment is defined as a current spawn task that is being executed with a last frame being removed.

13. The system of claim 10 wherein the first computer is configured to store the Function in the extra section.

14. The system of claim 13 wherein each execution entity includes a curtask that stores third data related to the Function for storage in the extra section.

15. The system of claim 9 wherein the predetermined event corresponds to one or more of a clock-based profiling event, a hardware counter overflow event, and a user defined debugging break point.

16. The system of claim 9 wherein the first computer is further configured to generate the user callstack trace for at least one of OpenMP, High Performance Fortran (HPF), Cilk, and Co-Array Fortran applications.

17. A computer program product having a non-transitory computer readable medium operable to store computer program logic embodied in computer program code encoded thereon for constructing a user callstack trace in a computer to monitor a user defined Function of a program in relation to one or more predetermined events, the computer program product comprising instructions for:

compiling a user program having the Function to generate executable code, the executable code including the Function and a plurality of outlined functions, wherein the plurality of outlined functions are artificial functions generated responsive to the compiling and are generally associated with the Function;

generating a spawn task for each outlined function;

executing the Function and the spawn tasks on a first execution entity;

spawning one or more of the plurality of outlined functions from the first execution entity such that the one or more of the plurality of outlined functions are executed on at least one second execution entity responsive to the first execution entity executing the spawn tasks;

obtaining a task record for each of the one or more of the plurality of outlined functions that are spawned, wherein a task record data structure includes a code section that stores a particular outlined function, a data section that stores first data the particular outlined function is needed to work on, and an extra section that stores the task record;

storing second data corresponding to the task record data structure in memory;

generating a user callstack trace for display to a user from the second data in the memory in relation to a predetermined event of interest to the user, the user callstack trace for communicating information corresponding to the execution of the Function for the predetermined event without the plurality of outlined functions; and adding a spawn location to the extra section to determine a local segment if the predetermined event occurs after one of the plurality of outlined functions is scheduled to execute but before the one of the plurality of outlined functions is actually executed.

\* \* \* \* \*